July 1, 1924.

D. L. LINDQUIST ET AL 1,499,385

CAR LEVELING APPARATUS

Filed April 2, 1920 5 Sheets-Sheet 1

INVENTORS
David L. Lindquist
Frederick Hymans
BY
L. H. Campbell
ATTORNEYS

Inventors
David L. Lindquist
Frederick Hymans
By their Attorney
L. H. Campbell

July 1, 1924.

D. L. LINDQUIST ET AL

CAR LEVELING APPARATUS

Filed April 2, 1920    5 Sheets-Sheet 3

1,499,385

Inventors
David L. Lindquist
Frederick Hymans
By their Attorney
L. H. Campbell

July 1, 1924.
D. L. LINDQUIST ET AL
1,499,385
CAR LEVELING APPARATUS
Filed April 2, 1920    5 Sheets-Sheet 4
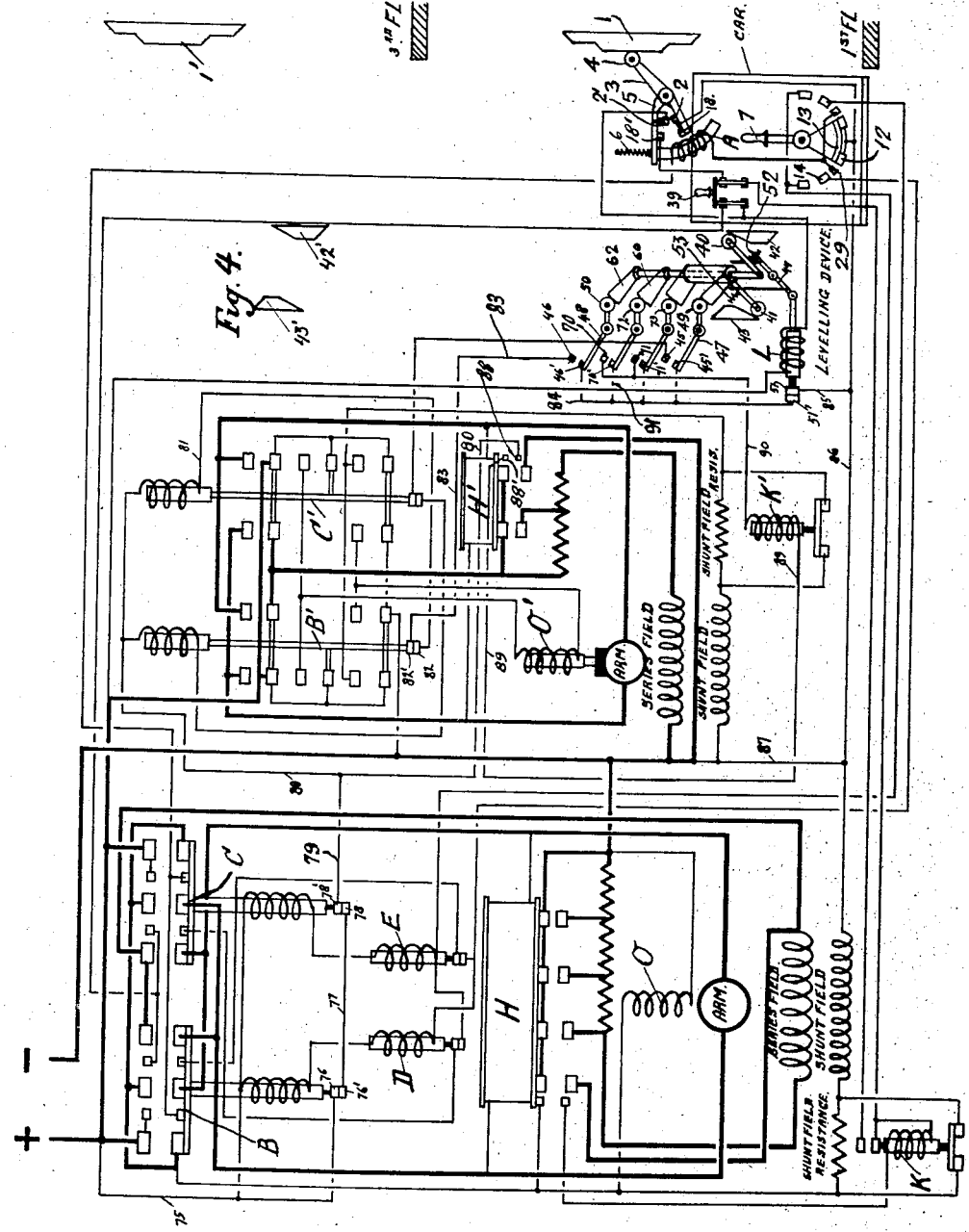
INVENTORS
David L. Lindquist
Frederick Hymans
BY
L. H. Campbell
ATTORNEYS

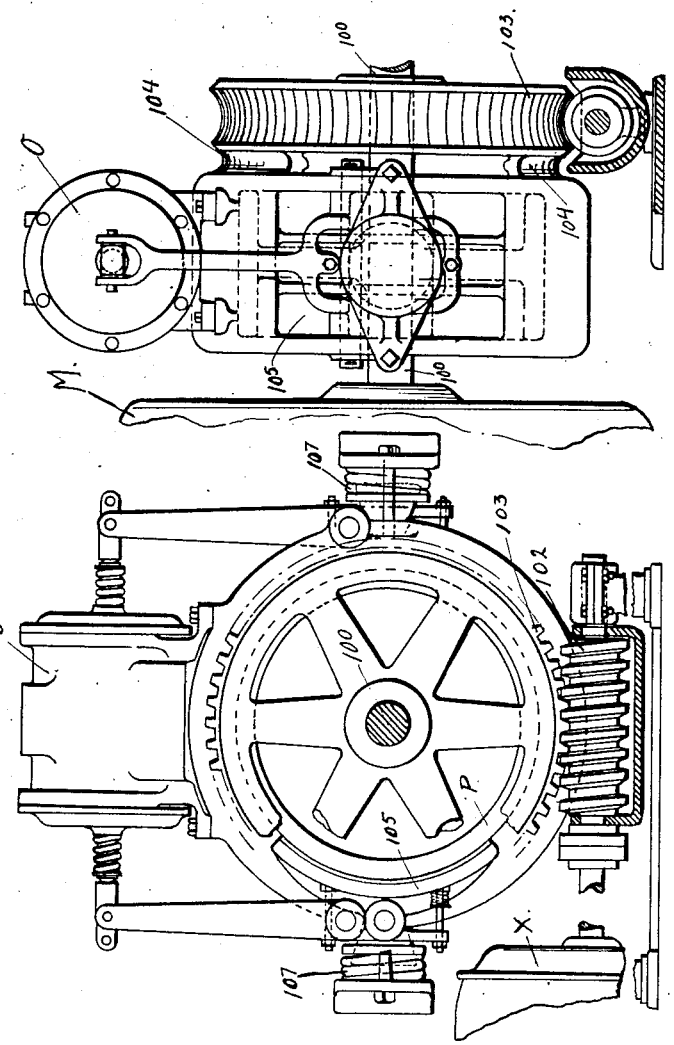

Patented July 1, 1924.

1,499,385

UNITED STATES PATENT OFFICE.

DAVID L. LINDQUIST, OF HARTSDALE, WHITE PLAINS, AND FREDERICK HYMANS, OF YONKERS, NEW YORK, ASSIGNORS TO OTIS ELEVATOR COMPANY, OF JERSEY CITY, NEW JERSEY, A CORPORATION OF NEW JERSEY.

CAR-LEVELING APPARATUS.

Application filed April 2, 1920. Serial No. 370,680.

*To all whom it may concern:*

Be it known that we, DAVID L. LINDQUIST, subject of the King of Sweden, residing in Hartsdale, White Plains, county of Westchester, and State of New York, and FREDERICK HYMANS, citizen of Netherlands, residing in Yonkers, in the county of Westchester and State of New York, have invented a new and useful Improvement in Car-Leveling Apparatus, of which the following is a specification.

The invention hereinafter described relates to the control of electric hoisting machinery for elevators, inclined railways and the like. The object is to bring the car to a stop level with the floor landing with a higher average speed than has heretofore been possible. Another object is to maintain the cage level with the landing during loading and unloading. Hoists of the kind referred to operate under various conditions of loading, owing to which, variations in the stopping distance are unavoidable.

A stop, level with the landing cannot therefore automatically be obtained except by the application of corrective means such as are the subject matter of our invention. The absence of reliable means to that effect has been the cause that push button control of electric hoisting machinery, notwithstanding its obvious advantages, has to date found application only to slow speed passenger service where variations in the stopping may be tolerated.

With car switch controlled machines, the desire of the operator to make the landing usually results in a premature slow-down which always entails a loss of time and frequently a waste of power. If the car is not level with the landing, he resorts to what is known as an "inching operation", endeavoring to make contacts of very short duration to which the car responds with small displacements. Generally the above operation has to be repeated several times. The jerky motion that is the result of the above operation is not only deteriorative to the apparatus, but is further objectionable because of the loss of time and waste of power.

In our invention, the corrective means to effect a level stop consists of a car leveling device, which however presents the distinctive novel feature of coming into operation only under certain conditions specified below.

In hoists of the kind referred to there is namely for either direction of travel a load occurring most frequently and which for distinction will be called the "average load."

In the present invention advantage is taken of this fact by arranging the operating device to automatically interrupt the power supply to the motor at a point before the car reaches the landing, and so adjusting it that a level stop is obtained with the average load. In this manner the travel from floor to floor takes place in the shortest possible time at least for those loads occurring most frequently without the need of corrective means to effect a level stop.

Since the average load or loads always lies between no load and more load, it will be seen that if the operating device is arranged as stated above, the stop with loads other than the average will either be too long or too short. Thus our invention comprises the novel feature of having a leveling zone extending above as well as below the landing, irrespective of the direction of travel. Obviously, since the operating device is adjusted to bring the average load to a stop flush with the landing the extension of the stopping zone above or below the landing will be comparatively short.

To effect a level stop with loads other than the average, our invention further comprises leveling apparatus so arranged that a car at any point within the above leveling zone passes automatically under its exclusive control until brought to rest level with the landing. The leveling apparatus therefore presents the novel feature of the control of a hoisting motor to move the car toward the landing irrespective of the position of the car within the leveling zone above or below the landing and irrespective of the direction in which the car travelled when under the control of the operating device.

Consider now a car brought to rest or nearly so, by the main operating device somewhere within the leveling zone. Immediately the leveling device makes contacts to move the car towards the landing, interrupting the power supply when the car is flush therewith. The duration of the above contact therefore depends on the distance above or below the landing at which the stop first occurred. Loads in the neighborhood of the average loads, for example, will stop in close proximity to the landing. The operation of the leveling device will consequently be for so short an instant, that the car, irrespective of its normal speed, cannot gain any appreciable velocity and comes to rest flush with the landing. Under such conditions, therefore, the car will be brought to a level stop at one single operation of the leveling device. With other loads than the average, the stop as effected by the operating device occurs an appreciable distance above or below the landing, with the result that the first operation of the leveling device lasts sufficiently long for the car to gather a relatively high speed. The car, instead of stopping flush with the landing, overruns; a second operation of the leveling device follows, returning the car to the landing, and if a level stop is not then obtained, a third operation of the leveling device, etc. takes place. Under certain conditions therefore—namely, with loads in the neighborhood of the extreme of loading, which occur with the least frequency—, the car may perform a number of oscillations across the landing with ever decreasing amplitude, until it is brought to a level stop. Thus this invention comprises the novel feature of selective action in bringing the car to a stop level with the landing.

In making the adjustments to favor certain loads of frequent occurrence, it will be obvious that the average duration of travel from landing to landing will be less than has been possible heretofore. It will further be clear, that with a device as above described, the extreme slow speed with which the machine otherwise has to be equipped will not be required. For example, the foregoing has been applied to a hoisting motor having a single speed. The source of supply is three phase, the control by means of a car switch and two modes of operation are possible. In one of them the mere centering of the car switch will bring the car automatically to rest flush with the landing. By opening the knife switch in the car, the operator retains control of the stop to the extent of bringing the car to rest somewhere within the stopping zone, whereupon the leveling device effects the level stop.

There are still other features and advantages of the invention not specifically referred to heretofore, but which will appear in the description hereinafter.

We attain the objects disclosed in the description by the mechanism illustrated in the accompanying drawings, in which—

Figure 4 is a modification of Figure 3 in which both the main and auxiliary motors have two speeds.

Figure 5 is an illustration of the revolving brake indicated in Figures 3 and 4, with parts broken away to make the drawing clearer.

Figure 6 is a side view of Figure 5.

Similar numerals refer to similar parts throughout the several views.

The main motor circuits are the same as usual. The automatic stopping feature is obtained by the addition of a switch mounted on the car and adapted to engage with cams 1 and 1'. A contact, 2, is placed on an arm, 3, at the end of which a roller 4, is mounted. The roller side of the switch arm, 3, is the heavier, so that in any position where there is no cam to support roller, 4, arm, 3, will drop and make contacts 2 and 2' whether or not magnet A is energized. Contact 2' is carried on the arm, 5, actuated by magnet, A. If magnet, A, is deenergized a spring, 6, holds the arm and contact 2' in the position shown. If magnet, A, is energized, contacts 2 and 2' are first made and further motion brings roller, 4, out of the path of cams, 1 and 1'.

Figure 1:
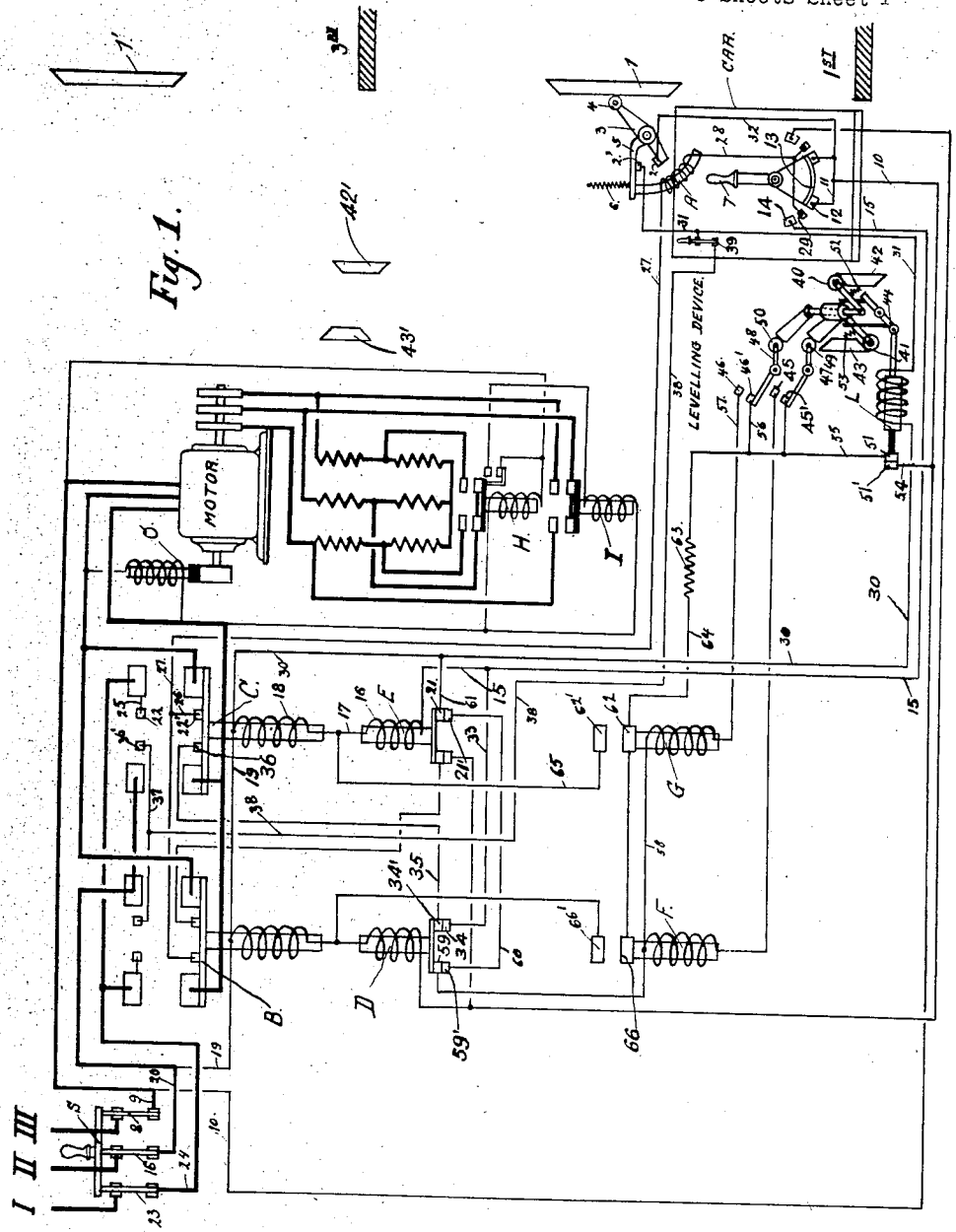
Figure 1 is a diagram illustrating our invention applied to an A. C. electric elevator hoisting motor having one speed.

Suppose the car is at rest at the first landing in the position shown in Figure 1 and is moved to the third landing or floor. The car switch handle, 7, is moved to the right, causing a current to flow from phase III through blade, 8, of the main line switch, S, conductors 9, 10 and 11 to contact 12, contact segment 13 and contact 14 in the car switch, from there through conductor 15, coil 16 on auxiliary switch E, conductor 17, coil 18 on reversing switch C, conductors 19 and 20, blade 16 on switch S to phase II.

The energizing of the coil of switch E opens the contacts 21 and 21' which are in a common feed wire to the coils on the switches F and G and which therefore remain inoperative so long as magnet coil 16 of the switch E is energized by the car switch. The operation of reversing switch C closes the circuits for the up motion and the car will increase in speed as the accelerating magnets H and I operate automatically one after the other and short circuit the resistance across the rotor. The auxiliary contacts 22 and 22' on reversing switch C when engaged, energize magnet A by the way of phase I, blade 23 of switch S, conductors, 24 and 25, auxiliary contacts 22 and 22' on reversing switch C, conductors 26 and 27, magnet coil on switch A, conductor 28, contact 29, segment 13, and contact 12 in the car switch, conductors 11, 10 and 9, blade 8 of switch S to phase III. The energization of the coil on switch A closes contacts 2 and 2' drawing the roller 4, out of the path of cams 1, 1', etc. When contacts 2 and 2' engage, the coil for switch L becomes energized and at the same time a selfholding circuit is closed for the coil 18 of switch C. The coil of switch L receives current from phase II through blade 16 on switch S, conductors 20, 19 and 30, coil on switch L, conductor 31, contacts 2 and 2', conductors 32, 11, 10 and 9, blade 8 on switch S to phase III. The selfholding circuit passes from phase II through blade 16 on switch S, conductors 20 and 19, coil on switch C, conductor 17, coil on switch E, conductors 15 and 33, contacts 34 and 34' on switch D, conductor 35, auxiliary contacts 36 and 36' on switch C, conductors 37 and 38, knife switch 39 in the car, conductor 31, contacts 2 and 2' on switch A, conductors 32, 11, 10 and 9, blade 8 on switch S to phase III.

The selfholding feature for the time being removes the control of the motor from the operator. He can however reverse the motion of the car if he so desires, since the energizing of coil D immediately separates its contacts 34 and 34' and opens the above selfholding circuit.

The energizing of switch L through the closure of contacts 2 and 2' on switch A, withdraws the rollers 40 and 41 out of the path of the leveling cams 42 and 42' and 43 and 43'. This is accomplished by means of the lever 44 which is mechanically connected to the plunger of switch L and to the arms on which the rollers 41 and 40 are mounted. The leveling contacts 45 and 45' and 46 and 46' will then close. The closing of the contacts 45 and 45' and 46 and 46' has no effect, however, due to the separation of contacts 51 and 51' on switch L. In order to stop at the third floor, the operator, shortly after leaving the second floor, brings the car switch handle 7 to center. Owing to the above selfholding circuit the only effect will be the deenergizing of magnet A. Since at this point there is no cam to limit the motion of arm, 3, on switch A, contacts 2 and 2' will not be opened. The car therefore proceeds as if nothing had happened until roller, 4, on switch A strikes cam 1'. As the roller, 4, runs up cam 1' the contacts 2 and 2' become separated and open the selfholding circuit as well as the circuit for the coil on switch L. All the switches return to their normal positions causing the power supply to be interrupted, the brake O applied and the leveling switch L returned to its operative position. The leveling device cannot however assume control until the restoration of both switches E and L. The current to the magnets of those switches is interrupted when roller, 4, runs up cam 1', which is shortly before the car reaches the third floor landing. It is therefore apparent that one or the other of these magnets may be so constructed (if so desired by means of a dashpot) that the restoration is long enough retarded to permit the car to come to rest and level with the landing solely by the operating device. It will then be seen that by a suitable construction and positioning of the cams 1 and 1', we actually accomplish bringing the average loads to a level stop without the aid of the leveling device, which merely serves to correct for over or under runs due to other conditions of loading.

By opening the knife switch, 39, the selfholding circuit mentioned above remains open. The operator therefore retains full control of the motor and the stop. He can either bring the car to level stop by means of the car switch or if the stop is too short or too long he leaves the car switch centered, when the leveling device will automatically stop the car level with the landing.

Suppose in the above case, the car should come to rest below the landing. Then, when the circuit of the coil of switch L is interrupted and the plunger returned to its normal position, the arms on which the rollers 40 and 41 are mounted will also be pulled to their normal position by springs 52 and 53 as shown in Figure 1. The cam 42' however is in the path of roller 40 so only the arm on which roller 41 is mounted will return to normal position and separate contacts 45 and 45', while the contacts 46 and 46' stay engaged. As soon as switch L and switch E are both restored to normal a circuit is closed for the switch G. This circuit may be traced from phase III through blade 8 of switch S, conductors 9, 10 and 54, contacts 51 and 51' on switch L, conductors 55 and 56, contacts 46 and 46' on the leveling apparatus, conductor 57, coil on switch G, conductor 58, contacts 59 and 59' on switch D, conductor 60, contacts 21 and 21', conductors 61, 30, 19 and 20, blade 16 on switch S to phase II. This circuit energizes switch G, which closes its contacts 62 and 62' and restores the circuit for the up-reversing switch C, by the way of phase III, blade 8 on switch S, conductors 9, 10 and 54, contacts 51 and 51' on switch L, conductor 55, resistance 63, conductor 64, contacts 62 and 62' on switch G, conductors 65 and 17, coil on switch C, conductors 19 and 20, blade 16 on switch S to phase II. It will thus be seen that the switch G restores the motor circuits again and the car will continue its upward motion until the roller 40 on the leveling device runs off of the cam 42'. Then the contacts 46 and 46' are interrupted mechanically and consequently interrupt the circuit for switch G, contacts 62 and 62' of which will interrupt again the circuit for the switch C and stop the motor, at which time the car has come level with the landing. Should the car have gained such a speed that it overruns the landing, then the roller 41 on the leveling device will run up cam 43' and cause the contacts 45 and 45' on the leveling device to become engaged and close the circuit for switch F, contacts 66 and 66' of which, when engaged, will close the circuit for the down-reversing switch B, which starts the car when operated back to the landing until the roller 41' runs off of cam 43'. By proper placing of cams 43 and 43' and 42 and 42' and adjustment of the leveling device, we are thus enabled to bring the car automatically level with the landing and maintain it level therewith should the car for any reason, such as for example, stretching or contraction of the cables when the car is loaded or unloaded, become slightly below or above the floor.

From the foregoing it will be realized that the greater the normal speed of the car the greater will be the length of the leveling zone above or below the landing and the greater will be the number of loads which require one or more of the above oscillations, before coming to a level stop. With certain car speed therefore it becomes of advantage to employ multi-speed motors and the embodiment of this invention in that respect is shown in Figure 2.

The source of supply in this illustration is D. C., the motor equipped with two speeds and the control by means of a car switch. The variable speed is obtained by the shunt field control and the slow-down as well as the stop is automatic. The opening of the knife switch 39 in the car brings both the slow-down and the stop within the control of the operator and the leveling device merely serves to correct the errors in the stop.

Figure 2:
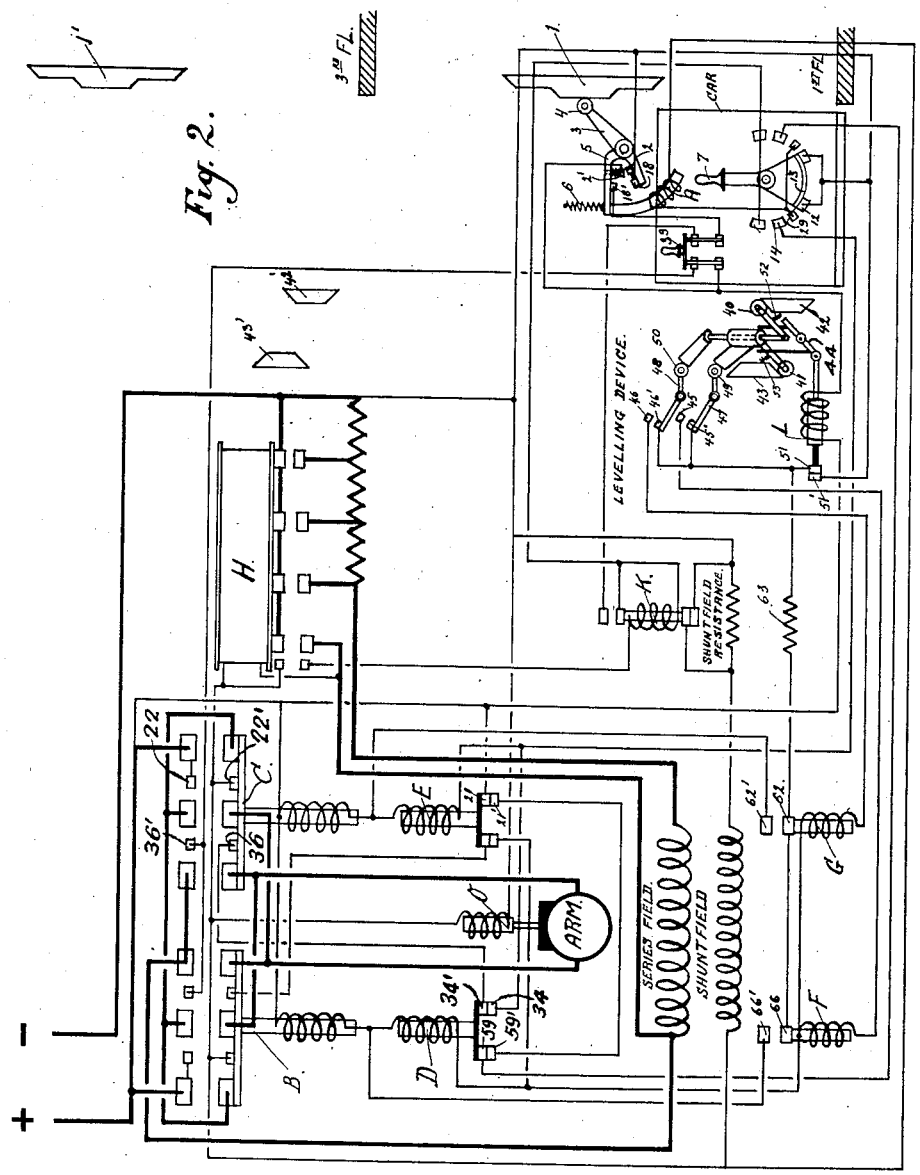
Figure 2 is a diagram illustrating our invention applied to a D. C. electric elevator hoisting motor with two speeds.

Except for the two speeds the general operation in Fig. 2 is the same as in Figure 1. Switch A is here equipped with two sets of contacts, 2 and 2', for the selfholding circuit of the reversing switches B and C, and 18 and 18' for the selfholding circuit for the fast and slow speed switch K. The cams, 1 and 1' have double action. If the operator wishes to stop, he centers his car switch and proceeds until roller 4 strikes the cam. The first action is to separate contacts 18 and 18' and drop the switch K which reestablishes the slow speed. As roller 4 runs further up cam 1', the arm 3 of switch A finally separates the contacts 2 and 2' and the reversing switch drops out, stopping the machine. The circuit through the coil on leveling switch L is interrupted simultaneously with the interruption of the current through the reversing switch coil. Since this occurs very shortly before the car reaches the landing, the car will practically have to come to a stop before the leveling device can become operative. The cams, 1 and 1', can therefore be designed and positioned in such a manner that a level stop with the average loads is actually obtained without operation of the leveling device.

Figure 3:
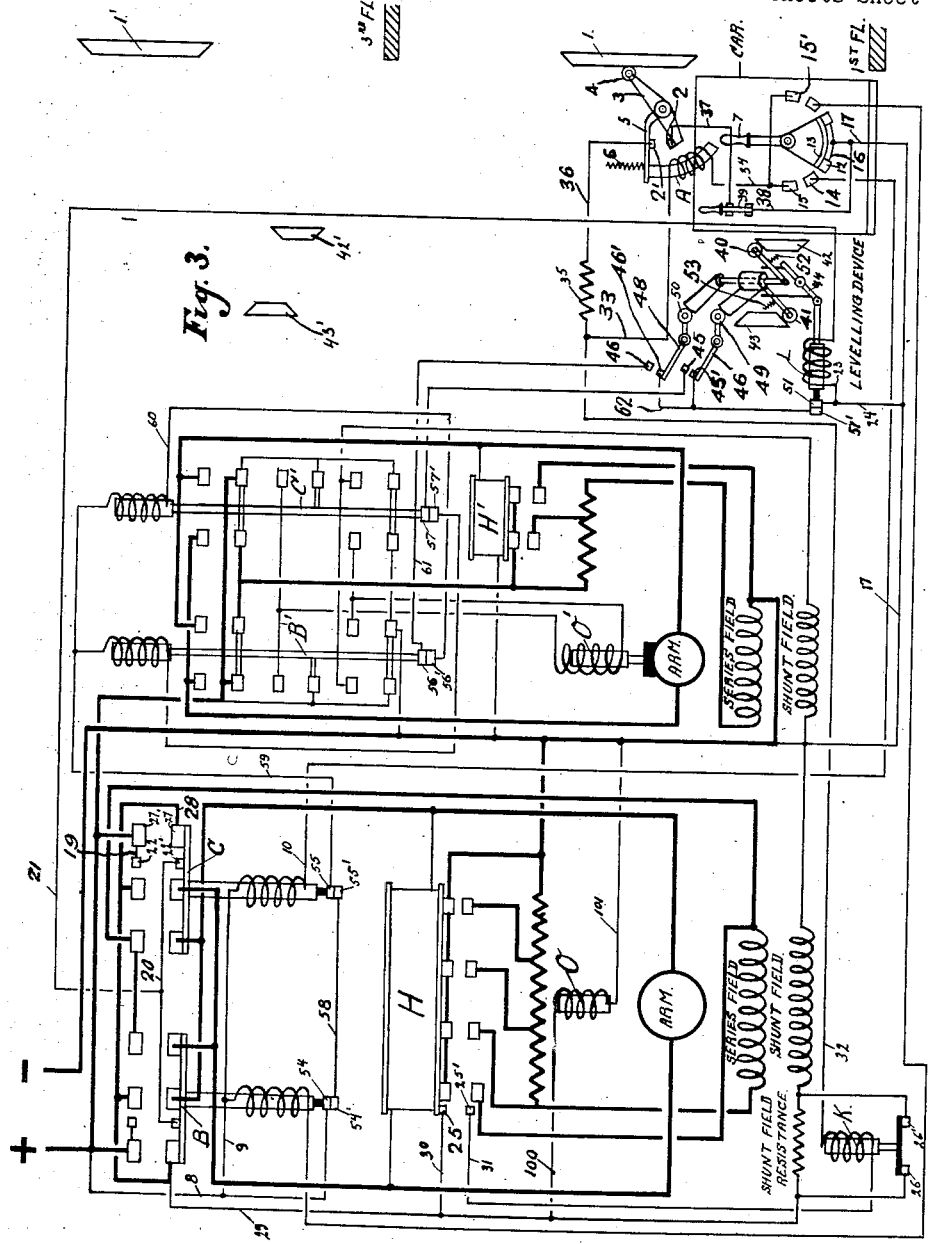
Figure 3 is a modification of Figure 2 in which there is a main hoisting motor having two speeds, and an auxiliary hoisting motor having only one speed.

Figures 3 and 4 show various applications of our invention to hoisting machines which employ two motors. In such machines the normal hoisting operations are executed by the main motor while the auxiliary motor is controlled by the leveling device to move the car towards the landing in case of overrun or underrun, and a revolving brake, such as shown in Figures 5 and 6 and in a patent to Furlow June 4, 1918, No. 1,268,111, is used to serve as a coupling between the two motors.

A brake pulley P is rotatable with the shaft 100 of the main motor M. The worm 102 is rotatable with the shaft of the auxiliary motor X and in mesh with a worm-wheel 103. The worm-wheel 103 is carried loosely in the main motor shaft 100. A brake apparatus O is rotatable bodily with the worm-wheel 103 and about the brake pulley P. Arms 104 connect the brake apparatus to the worm-wheel. The brake apparatus may be of any well-known type in which the brake shoes 105 are released electrically as by means of an electro-magnet O and applied mechanically as by means of the usual brake springs 107.

Figure 3 is a modification of Figure 1; the source of supply is D. C. The main motor has two speeds and the auxiliary motor only one. The slow-down of the main motor is automatic unless the knife switch 39 in the car is opened, which gives the operator full control over the main motor to the extent of bringing the car to rest within the leveling zone.

Suppose the car has to be moved from the first floor to the third floor. The operator then moves the car switch handle 7 to the right, so that the segment 13 connects the contacts 12, 14 and 15 together. A circuit is then closed from the main + through the conductors 8 and 9, coil on up-reversing switch C, conductor 10, contact 14, segment 13 and contact 12 in the car switch, conductors 16 and 17 to the main − and the reversing switch C operates.

The auxiliary contacts 22 and 22', when engaged, close the circuit for the coil on switch L of the leveling device, the plunger of which pulls the rollers 40 and 41 from the cams 42 and 42' and 43 and 43'. The contacts 45 and 45' and 46 and 46' will then close, but are ineffective as the common feed is interrupted by the contacts 51 and 51' on switch L.

The circuit for the coil of switch L may be traced from the main + through conductor 19, auxiliary contacts 22 and 22' on switch C, conductors 20 and 21, coil on switch L, conductors 23 and 24 and 17 to the main —.

When all the main contacts of switch C are engaged, the revolving brake O will be released and the motor starts revolving in the up direction increasing in speed as the accelerating magnet H cuts out gradually the starting resistance. The circuit for the revolving brake may be traced from the main +, contacts 27 and 27' on switch C, conductors 28, 29 and 100, brake coil O, conductor 101 to the main —. On the last arm of the accelerating magnet H are the auxiliary contacts 25 and 25' which, when engaged, close the circuit of the fast and slow speed switch K. The energizing of the coil on switch K causes its plunger to break the connection between the contacts 26 and 26' on switch K, which contacts insert the shunt field resistance in series with the shunt field of the main motor and brings the car up to full speed. The circuit for the switch K may be traced from the main + through the contacts 27 and 27' on switch C, conductors 28, 29 and 30, auxiliary contacts 25 and 25' on switch H, conductor 31, coil on switch K, conductors 32 and 33, coil on switch A, conductor 34, contact 15, segment 13 and contact 12 in the car switch, conductors 16 and 17 to the main —.

At the same time as the switch K becomes operative, the coil on switch A receives current and the latter's plunger will first close the contacts 2 and 2' and finally moves the arm 3 back so far that the roller 4 is out of the path of the cams, 1 and 1'. When the contacts 2 and 2' are engaged a holding circuit is closed for the switch K, which takes the control of that switch away from the operator for the time being. The opening of the knife switch 39 in the car however will open that holding circuit and bring switch K under the control of the operator again. That holding circuit may be traced from the coil on switch K through conductor 32, resistance 35, conductor 36, contacts 2 and 2' on switch A, conductor 37, knife switch 39, conductors 38 and 17 to the main —.

The car is now travelling at high speed and to stop the car at the third floor, the operator, shortly after passing the second floor, moves the car switch handle 7 sufficiently toward center to move the segment 13 off of the contact 15. This deenergizes switch A, releasing the switch arm 3. At this point however, there is no cam to engage the roller 4 of switch A, and its contacts 2 and 2' therefore remain closed, holding the fast and slow speed switch K energized. The car therefore continues at fast speed. Shortly before reaching the third floor, the roller 4 of switch A strikes cam 1', opening the contacts 2 and 2', releasing switch K and establishing slow speed. In this arrangement the operator is relieved from exercising his judgment as to when to slow down the car and saves time otherwise lost in the usual premature reduction of speed. With the car now approaching the landing the operator is in a better position to gage his landing accurately and at the proper time he centers his car switch handle to stop the car flush with the landing. If he misses the landing the level stop will be effected automatically by the leveling device.

In case the car should come to a stop below the landing, the roller 41 of the leveling device will be pulled back in the position as shown on Figure 3, by its spring 53, while the roller 40 will strike the cam 42' and allow the contacts 46 and 46' to remain closed. Then, when the switch L is returned to its normal position and the contacts 51 and 51' engaged, the up-reversing switch C', for the auxiliary motor will receive current from the main +, through conductor 8, auxiliary contacts 54 and 54' on switch B, conductor 58, auxiliary contacts 55 and 55', on switch C, conductor 59, coil on up-reversing switch C', conductor 60, contacts 56 and 56' on switch B', conductor 61, contacts 46 and 46' on the leveling device, conductor 62, contacts 51 and 51' on switch L, conductors 24 and 17 to main —.

It should be noticed that the switch C' or B' cannot operate unless the reversing switches for the main motor have returned to their normal position, as the main feed wire for the switches C' and B' are interrupted by the auxiliary contacts 54 and 54' and 55 and 55'. When switches B and C have dropped back they have interrupted the circuit for the revolving brake O, which not only serves to stop the main motor, but at the same time functions as a coupling between the shafts of the main and auxiliary motors. So that when the switch C' operates and closes its contacts, it will first release its own brake O' and then start the auxiliary motor running which is now connected to the shaft of the main motor by the revolving brake O, and consequently raises the car slowly to the landing, increasing in speed as the accelerating switch H' cuts out gradually the starting resistance and series field for the auxiliary motor.

When the roller 40 on the leveling device rolls off of the cam 42', it opens the contacts 46 and 46' which interrupt the circuit for the switch C' and the auxiliary motor and car will come to a stop. Should the car however obtain such a speed that it coasts above the landing, the roller 41 on the leveling device will have rolled up cam 43' and closed contacts 45 and 45' on the leveling device, which will operate the switch B' and reverse the auxiliary motor, so that the car is brought back to the landing and flush therewith as the operation of switch B' was so short, that the auxiliary motor could not come up to full speed.

Figure 4 is a modification of Figure 3. The source of supply is D. C. and in this case both the main and auxiliary motors have two speeds. The various speeds in both motors are effected by resistances in series with the shunt fields, which resistances for slow speed are short circuited by the fast and slow speed switches K and K'.

The switch A in Figure 4 establishes a holding circuit for the reversing switches B and C with contacts 2 and 2' and another holding circuit for the fast and slow speed switch K with the contacts 18 and 18' so that the stop is entirely automatic unless the knife switch 39 in the car is opened, which gives the operator full control of the machine again.

The operation of the controlling device for the main motor is the same as in Figure 2, with the only difference, that the brake O in Figure 4 is a revolving brake which serves as a clutch or coupling between the main and auxiliary motors as well, as in Figure 3. On the leveling device extra sets of contacts 70 and 70' and 71 and 71' are shown which serve for the fast and slow speed switch K' and for the auxiliary motor.

The type of machine illustrated in Figure 4 is of the high speed type and of which even the slow speed is so high that it necessitates an auxiliary motor with two speeds to bring loads other than the average to a level stop with the landing in the shortest amount of time possible.

It will be seen that the leveling zone above and below the landing is rather large, which is another reason why the auxiliary motor is equipped with two speeds.

Suppose the car nearly loaded to capacity comes to a stop below the landing. Then the roller 40 will be engaged by cam 42' and as the reversing switches B or C for the main motor are open, and contacts 51 and 51' of switch L are closed, the contacts 46 and 46' and 70 and 70' remain closed and cause a current to flow from the main + through conductor 75, contacts 76 and 76' on switch B, conductor 77, contacts 78 and 78' on switch C, conductors 79 and 80, coil on switch C', conductor 81, contacts 82 and 82' on switch B', conductor 83, contacts 46 and 46' on leveling device, conductor 84, contacts 51 and 51' on switch L, conductors 85, 86 and 87 to main —.

The switch C' will now operate and close the main circuits to the auxiliary motor which is coupled to the shaft of the main motor by the revolving brake O. After the brake O' is released, the auxiliary motor will start the car toward the landing with increasing speed, as the accelerating switch H' short circuits step by step the starting resistance and the series field and inserts the shunt field resistance in series with the shunt field, by operating the fast and slow speed switch K', when the last arm on the accelerating switch H' closes the auxiliary contacts 88 and 88'. The circuit for the fast and slow speed switch K' may be traced from the main + through conductor 75, contacts 76 and 76' on switch B, conductor 77, contacts 78 and 78' on switch C, conductors 79 and 80, auxiliary contacts 88 and 88' on the last arm of switch H', conductor 89, coil on switch K', conductor 90, contacts 70 and 70' on the leveling device, conductors 91 and 84, contacts 51 and 51' on switch L, conductors 86, 85 and 87 to the main —.

The car now approaches the landing at full speed of the auxiliary motor and at a predetermined time the roller 40 on the leveling device starts rolling off of the cam 42'. Then first the cam 60 will engage the roller 72 on the leveling device, and open the contacts 70 and 70', thereby interrupting the circuit for the fast and slow speed switch K' which drops back and short circuits the shunt field resistance, thereby establishing slow speed. The car now approaches the landing at very slow speed and as finally the roller 40 on the leveling device runs further off the cam 42', the cam 62 will engage the roller 50 on the leveling device and open the contacts 46 and 46'. Then the circuit for the switch C' is interrupted and when the switch drops out the circuits to the auxiliary motor and brake O' are interrupted and the car will come to rest level with the landing. Should the car however overrun the landing, the roller 41 on the leveling device will roll up cam 43' and close the contacts for the switch B', which will start the auxiliary motor in the opposite direction and bring the car back to the landing and flush therewith.

Whereas we have disclosed our invention applied to control motors of single and two speeds, it is obvious that our invention is applicable to control motors of more than two speeds.

Having thus described our invention, what we claim is:

1. In an electric elevator, the combination of the car, electric motor hoisting mechanism, and the electric control mechanism for the car, comprising a reversing switch and also a car stopping switch device, including an electromagnet to close the stopping switch device and another device to open the stopping switch, to enable said stopping switch device automatically to control the motor hoisting mechanism to stop the car with a predetermined load level with the desired floor landing.

2. In an electric elevator, the combination of the car, electric motor hoisting mechanism, and the electric control mechanism for the car, comprising a reversing switch and also a car stopping switch device, including an electromagnet to close the stopping switch device and another device to open the stopping switch, to enable said stopping switch device automatically to control the motor hoisting mechanism to stop the car with a predetermined load level with the desired floor landing, and a car leveling device adapted to cause the hoisting motor mechanism automatically to bring the car with loads other than the predetermined load level with the desired landing whether the car overruns or underruns the said landing.

3. In an electric elevator, the combination of an electric motor, the operating switch for the car, means comprising a car stopping switch and an electro-magnet operable by the car operating switch both to close and control the car stopping switch and adapted by the movement of the elevator in the stopping operation of the car to open, and a car leveling device to control the motor to bring the car to a stop level with the desired landing, whether or not the car underruns or overruns the landing.

4. In an electric elevator, the combination of a car, a single hoisting multi-speed electric motor, means, including an electro-magnetically and mechanically operable switch, in the elevator well automatically to control the motor to stop the car with a predetermined load level with the landing, a leveling device in the elevator well to operate the motor at its different speeds to bring the car with loads other than the predetermined load to a stop level with the landing whether the said car underruns or overruns the landing.

5. In an electric elevator, the combination of the car, hoisting electric motor mechanism, a switch for operating the elevator, and cams in the hatchway, a car stopping device to control the motor mechanism and stop the car with a predetermined load level with the landing, said stopping device operable by the switch for operating the elevator and by said cams in the hatchway, a car leveling device to control the motor mechanism to bring the car with any other load than the predetermined load to a level stop with the landing.

6. In an electric elevator, the combination of a hoisting electric motor mechanism, a switch for operating the elevator, and cams in the hatchway, a car stopping device to control and stop the car with a predetermined load level with the landing, said stopping device controlled by the switch for operating the elevator and by said cams in the hatchway, an automatic car leveling device, switches on the leveling device to control the hoisting mechanism, and cams in the hatchway to open the switches on the leveling device, after said leveling device has automatically caused the car with any other load than the predetermined load to become level with the landing in case the car overruns or underruns the landing.

7. In an electric elevator, the combination of a hoisting multi-speed electric motor mechanism, a switch for operating the elevator, a reversing switch, a fast speed switch, and double acting cams in the hatchway, and a car stopping device adapted to control the hoisting mechanism and stop the car with a predetermined load level with the landing, said stopping device controlled by the car operating switch and said cams, and controlling the speed and reversing switches.

8. In an electric elevator, the combination of a hoisting multi-speed electric motor mechanism, a switch for operating the elevator, a reversing switch, a fast speed switch, and double acting cams in the hatchway, and a car stopping device including an electro-magnet, adapted to control the hoisting mechanism and stop the car with a predetermined load level with the landing, said stopping device controlled by the car operating switch and said cams, and controlling the speed and reversing switches.

9. In an electric elevator, the combination of a hoisting multi-speed electric motor mechanism, a switch for operating the elevator, a reversing switch, a fast speed switch, and double acting cams in the hatchway, and a car stopping device including an electro-magnet, adapted to control the hoisting mechanism and stop the car with a predetermined load level with the landing, said stopping device controlled by the car operating switch and said cams, and controlling the speed and reversing switches, and automatic car leveling device, switches on the leveling device to control the hoisting mechanism, and cams in the hatchway to open the switches on the leveling device, after the leveling device has automatically caused the car with any other load than the predetermined load to become level with the landing in case the car overruns or underruns the landing.

10. In an electric elevator, the combination of a switch for operating the elevator, the car, a hoisting multi-speed electric motor mechanism, and a car stopping switch device, adapted to control the multiple speeds of the hoisting mechanism and stop the car with a predetermined load level with the landing, said stopping switch device including an electromagnet adapted, upon closing the elevator operating switch, to become energized and close the switch of the stopping device, and cams adapted to open the stopping switch device after the operation of opening the elevator operating switch, an automatic car leveling device, switches on the leveling device to control the speeds of the motor mechanism, and having a common feed wire, cams in the hatchway, rollers on said leveling device to engage the cams and open the switches on the leveling device, an electromagnet to move the rollers out of the way of the cams and close the switches on said leveling device, the magnet adapted to be energized upon the closing of the circuit of the elevator operating switch, a switch on the magnet and adapted to be operated thereby, said switch being in the circuit of the common feed wire to the switches on the leveling device, the leveling device being adapted to bring the car with any load other than the predetermined load to a stop level with the landing.

11. In an electric elevator, the combination of the car, and a hoisting multi-speed electric motor mechanism, comprising means in the elevator well to control the motor and stop the car with a predetermined load level with a desired floor landing, a car leveling device, comprising switches, an electromagnet and cams in the elevator well, one of the switches adapted to be opened by the magnet and others to be held closed by the cams to control the speeds of the hoisting mechanism when the car stops above or below the landing and bring the car to level stop with the said landing.

12. In an electric elevator, and the elevator operating switch, the combination of the car, a hoisting multi-speed electric motor, a switch device, including an electromagnet and cam in the elevator well, adapted to be operated, upon the closing of the elevator operating switch, to close to effect a circuit to the hoisting motor and the cam to function to open the switch device to cause the release of a circuit to the hoisting motor, to control the motor and cause the car with a predetermined load to stop level with a desired floor landing, and a car leveling device to operate the hoisting motor to bring the car with loads other than the predetermined load to a level stop with the landing.

13. In an electric elevator, the combination of the car, a car operating switch, a hoisting multi-speed electric motor, an automatic stopping device to stop the car with a predetermined load level with a desired floor landing, operable by said switch, said automatic stopping device comprising switches adapted to be normally closed, cams adapted to open the normally closed switches of the stopping device, and a car leveling device, to operate and control the motor to bring the car with a load other than the predetermined load level with the desired landing whether the car overruns or underruns the landing.

14. In an electric elevator, the combinaiton of the elevator operating switch mechanism, the car, a hoisting multispeed electric motor, a car stopping device, including an electromagnet and cam in the elevator well, to control the hoisting motor and stop the car with a predetermined load level with a desired floor landing, said electromagnet adapted to become energized by the closing of the elevator operating switch, an automatic car leveling device, switches on the leveling device and cams to control the car, and adapted to be held closed by said cams, and another electromagnet, whereby the cams do not function in the operation of the car when it is not desired.

15. In the art of electric elevator, the combination of the switch for operating the elevator, a reversing switch for the elevator, a coil therefor, adapted to be energized to close the reversing switch, another switch adapted to close upon the closing of the reversing switch to condition a circuit for holding the reversing switch closed, and another switch device, comprising an arm and electromagnet, the latter adapted to become energized as the result of closing the elevator operating switch and move the arm to close the circuit to hold the reversing switch closed, and a cam to move said arm to open the switch device and allow the reversing switch to open in the operation of stopping the elevator.

16. In an electric elevator, the combination of the electric hoisting apparatus, the reversing switch, an electromagnet adapted to become energized to close the reversing switch, electric contacts adapted to close upon the closing of the reversing switch, a magnet winding adapted to become energized and a circuit conditioned to be closed by the closing of the contacts, and a second switch adapted upon the energization of said magnet winding to close, and close the circuit to enable the electromagnet of the reversing switch to hold it closed, said second switch also adapted to be opened mechanically by the movement of the car and open said holding circuit to allow the reversing switch to open, and the elevator come to rest.

17. In an electric elevator, the combination of the car, the electric hoisting apparatus, a reversing switch, an electromagnet to close the reversing switch, a second and third switch adapted to close upon the closing of the reversing switch, a magnet winding adapted to become energized upon the closing of the second switch, a fourth switch adapted upon the energization of said magnet winding to close and together with the third switch cause said electromagnet of the reversing switch to hold it closed, said fourth switch also adapted to be opened mechanically by the movement of the car and deenergize the magnet of the reversing switch to allow it to open, and an apparatus including another switch adapted in case the car in the operation of stopping at a desired landing under or over runs it automatically to control the hoisting apparatus and level the car with the landing.

18. In an elevator, the combination of an electric hoisting motor mechanism, a switch for operating the elevator, a reversing switch, a magnet winding therefor, a circuit for the winding, a holding circuit for the reversing switch, to be closed upon the operation of the switch for operating the elevator and adapted to be opened to allow the reversing switch to open, and a car leveling apparatus adapted automatically to effect the closing of said reversing switch in the operation of bringing the car to a level stop with a landing.

19. In a multi-speed elevator, the combination of a control mechanism for the elevator, comprising electro-magnetically operable reversing switches, a speed switch, self-holding circuits for the switches, and electro-magnetic stopping switch for the elevator having contacts in the self-holding circuits, and cams to open said stopping switch.

20. In a multi-speed elevator, the combination of a control mechanism for the elevator, comprising electro-magnetic reversing switches, a speed switch, a holding circuit for the speed switch, and electro-magnetic stopping switch for the elevator having contacts in said holding circuit, and cams to open said stopping switch.

21. In an elevator, the combination of a car switch, electro-magnet reversing switch, and a second electro-magnet switch, adapted to be operated upon closing the car switch, a third electro-magnet switch to hold the reversing and second switches in operated position, means cooperative with said third switch to open it to allow the reversing and second switches to return to their normal position, a fourth electro-magnet switch adapted as the result of the return of the second switch to normal position to close the circuit to the reversing switch and a car leveling device to open said circuit to stop the car level with a desired floor landing.

22. An electric elevator system comprising in combination, means controlled by the operator for running the elevator, slow-down means correlated to the respective landings and means actuated by the operator during running for rendering operable the slow-down means upon arrival at a predetermined distance from the desired landing.

23. An electric elevator system comprising in combination, automatic stopping means correlated to the respective landings, means continuously controlled by the operator for running the elevator at full speed, an automatic slow-down mechanism, and means actuated by the operator during running for rendering operable the automatic slow-down and stopping mechanisms upon arrival at a predetermined distance from the desired landing.

24. An electric elevator system comprising in combination a car control switch, means enabling the return of the switch from a running position to neutral position at any point in a definite zone with relation to each floor without immediate interruption of the running of the car, and means for stopping the car at a selected floor determined by the zone within which said switch is returned to neutral position.

25. An electric elevator system comprising in combination a car control switch, means enabling the return of the switch from a running position to neutral position at any point in a definite zone with relation to each floor without immediate interruption of the running of the car, and automatic means for stopping the car at a selected floor determined by the zone within which said switch is returned to neutral position.

26. In an electric elevator, the combination of the hoisting motor, circuits for controlling the motor, a switch carried on the car for closing one of said circuits and a switch in the car for closing another of said circuits and for operating said switch carried on the car to close the said first mentioned one of the circuits and means cooperating with the switch carried on the car to open it to stop the car at the floor at which it is desired to stop the car.

27. In an electric elevator, the combination of the hoisting motor, circuits for controlling the motor, a switch carried on the car for closing one of said circuits and a switch in the car for closing another of said circuits to start the car and operate the switch carried on the car to close the said first mentioned one of the circuits, and means to hold said last mentioned circuit closed, whereby the switch to start the car can be moved back to its neutral position without interrupting the running of the car and means cooperating with the switch carried on the car to open it to stop the car at the desired floor.

28. An electric elevator system comprising in combination means for initiating slow-down at any point at will and means for initiating slow-down automatically at prescribed points, each of said means being controlled by the operator during the running of the car.

29. An electric elevator system comprising in combination, means for running the elevator at full speed, means for, at any time, initiating stopping, and means for automatically initiating slowing down the elevator, all of said means being under the control of the operator while the elevator is running.

30. An electric elevator system, comprising in combination automatic slow-down and stopping mechanism, means continuously under control by the operator for running the elevator at full speed, means under the control of the operator during running for rendering operable the automatic slow-down and stopping mechanism upon arrival at a predetermined distance from the desired landing.

31. An electric elevator system comprising in combination means for automatically initiating a reduction of the elevator speed, and a car switch, said car switch comprising a lever which has one position for full speed operation, another position for rendering operative the said means, and a third position for enabling the operator to stop the car at will.

In testimony whereof, we have signed our names to this specification.

DAVID L. LINDQUIST.
FREDERICK HYMANS.